June 12, 1962  F. O'CONOR ETAL  3,038,611
CENTRIFUGAL SEPARATORS

Filed May 8, 1957  4 Sheets-Sheet 1

*INVENTORS.*
FRANK O'CONOR
EDWARD A. DAUBMAN

BY

ATTORNEY

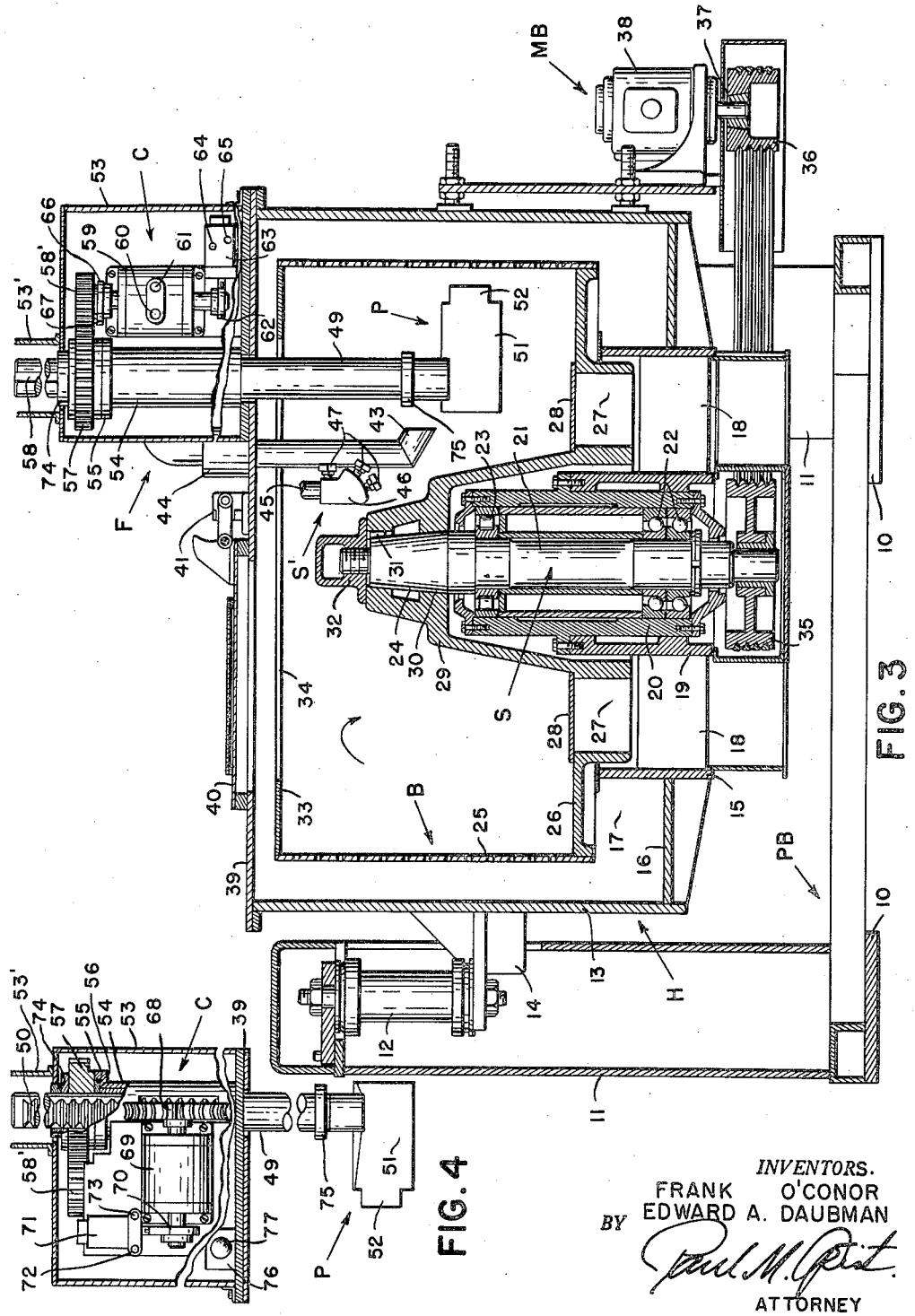

June 12, 1962   F. O'CONOR ETAL   3,038,611
CENTRIFUGAL SEPARATORS

Filed May 8, 1957   4 Sheets-Sheet 3

TYPICAL TIMING CYCLES

INVENTORS.
FRANK O'CONOR
BY EDWARD A. DAUBMAN

*Paul M. Gist*

ATTORNEY

United States Patent Office 3,038,611
Patented June 12, 1962

3,038,611
CENTRIFUGAL SEPARATORS
Frank O'Conor, Moline, and Edward A. Daubman, East Moline, Ill., assignors to Ametek, Inc., a corporation of Delaware
Filed May 8, 1957, Ser. No. 657,801
17 Claims. (Cl. 210—138)

The present invention relates to centrifugal separators, and particularly to a new and improved bottom discharge type of centrifugal separator that is adapted manually to be controlled as well as automatically to be operated through various predetermined cycles of operations.

In the commercial operation of centrifugal separators, a mixture of solids and liquids is delivered into a gyratory basket having a perforated side wall through which liquid in the mixture is expelled by the spinning of the basket so as to leave an annular wall of solids adhering to the inner sides of the perforated basket wall. This wall of solids is then removed from the basket by the cutting action of a discharge shoe which is turned into the solid wall and lowered in the basket as the basket is slowly rotated so as to force the solids against the shoe.

Heretofore, discharging the centrifugal basket has been an arduous task for the attendant, and it has involved serious risks and damage to baskets and dischargers, and even injury to the attendant. Not only has the attendant generally been required to control the movements of the shoe by levers and handwheels to effect its oscillatory motion into contact with the solids caked on the wall of the gyratory basket, but various other operations required by the attendant in feeding the mixture of solids and liquids into the gyratory basket, changing the speed of the basket from a low feeding speed to a relatively rapid extracting speed, operating a liquid spray for washing the solids when desired, reducing the speed of the basket to an unloading speed, and other operations necessary to the complete cyclic operation of the centrifugal separator-required exceptionally skilled labor which, in spite of heretofore devised precautionary measures, failed to insure the maximum obtainable results from the centrifugal separator.

While many attempts have been made to devise automatic cycle control apparatus for centrifugal separators to overcome the shortcomings of skilled labor, most of the known controls fail to achieve the results demanded by the centrifugal separating art.

One of the principal objects of the present invention is to provide a centrifugal separator that will require a minimum of attention by an operator and still be capable of repetitive cyclic operations and in which great flexibility in the cyclic arrangements exists.

Another object of the present invention is to provide a centrifugal separator having a variable speed hydraulic drive for the gyratory basket that includes a braking arrangement to reduce the speed of the basket from an extracting speed to an unloading speed by the normal function of the variable speed drive in changing from a high speed to a low speed.

Another object of the invention is to provide a centrifugal separator including an hydraulically operated discharging mechanism and control therefor, which discharging mechanism can be made to perform a cycle of operation by the actuation of a single lever.

Another object of the invention is to provide a discharging mechanism that will effectively prevent the escape of noxious fumes from, and the ingress of foreign matter to the interior of the centrifugal separator.

Another object of the present invention is to provide a cyclically operable unloading mechanism that is capable of being incorporated within a main cycle of operations in the latter of which feeding of the material to be treated to the separator, varying the speed of the basket of the separator, introducing one or more washing sprays into the separator basket are automatically controlled.

Still another object of the invention is to provide a cycle control means for a centrifugal separator wherein the feeding of the material to be treated and the washing of that material may be effected at preselected points in the main cycle of operation of the centrifugal separator.

One phase of the invention includes the provision of a variable displacement hydraulic pump that drives an hydraulic motor that is connected to the rotary basket of the separator. The hydraulic motor is of the positive displacement type and consequently can act as a braking means when it is desired to reduce the speed of the gyratory basket from an extracting speed to an unloading speed. In this phase of the invention, it is only necessary to change the delivery of the hydraulic pump to the hydraulic motor.

Another phase of the invention is the provision of an hydraulically operated plow mechanism for removing caked solids that adhere to the inner wall of the rotary basket. This plow mechanism may be partially rotated into the solids adhering to the wall of the rotating basket by a vane-type hydraulic motor, the partial rotation of which can be accurately adjusted to prevent the plow blade from contacting the wall of the basket. This hydraulic vane-type motor may be connected in a circuit with another similar vane-type hydraulic motor for causing a rack and pinion drive to lower the plow along the vertical wall of the rotating basket thereby to remove the solids therefrom without, however, requiring the teeth of the rack to pass into the machine. Provision may be made to limit the downward and upward movement of the plow so that it will not move into contact with the bottom or top of the rotating basket. A manually operable main control valve may be provided in the hydraulic circuit for the two vane-type hydraulic motors so that their operation may be predetermined and initiated in a cycle to effect the removal of solids from the wall of the rotating basket.

Another phase of the present invention is the provision of a combination of timing mechanisms and relays for effecting a completely automatic cycle of operations including an initial operation at the beginning of each cycle of operations that insures the unloading of the rotary basket of the centrifugal separator prior to the feeding of material to be treated thereinto. This phase of the invention may encompass within the main cycle of operations the sub-cycle of operations that controls the operation of the hydraulically actuated plow mechanism.

The above, as well as other objects and novel features of the invention will become apparent from the following specification and accompanying drawings which are merely exemplary, and in which:

FIG. 3 is an enlarged sectional elevational view of the centrifugal separator as shown in FIGS. 1 and 2;

FIG. 4 is an elevational view of the unloading mechanism of the centrifugal separator shown in FIGS. 1, 2 and 3;

Figure 2:
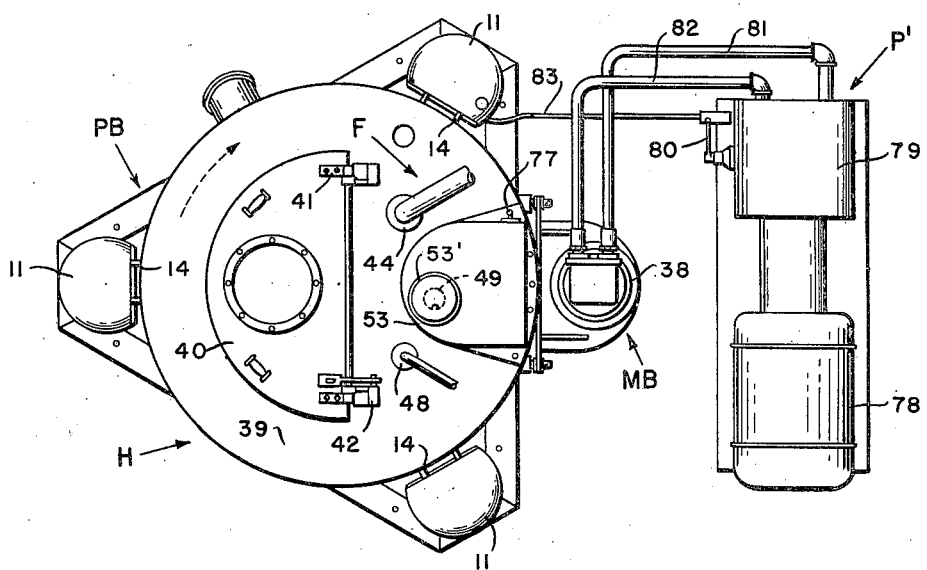
FIG. 2 is a top plan view of the centrifugal separator shown in FIG. 1.
Figure 1:
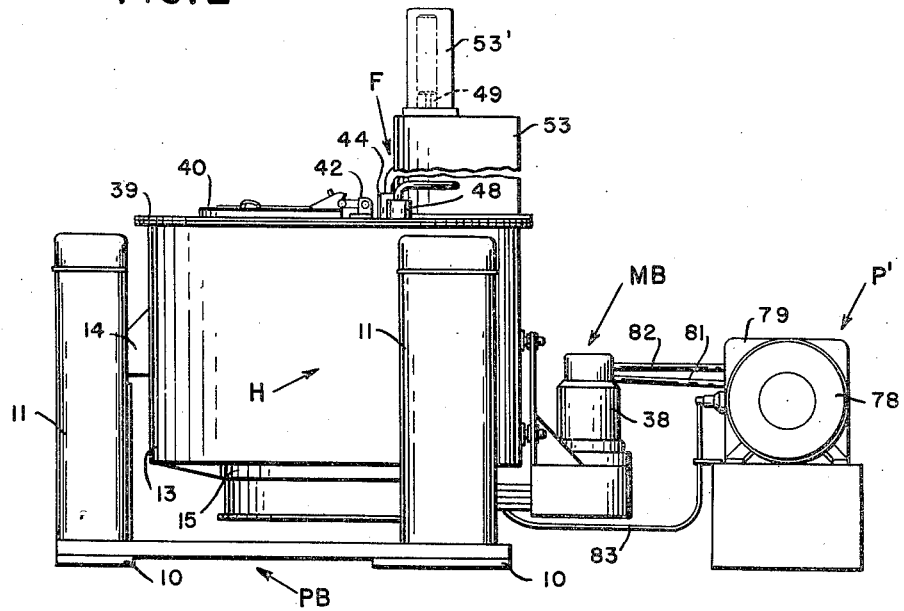
FIGURE 1 is a side elevational view of a centrifugal separator to which the principles of the present invention have been applied.
Figure 7:
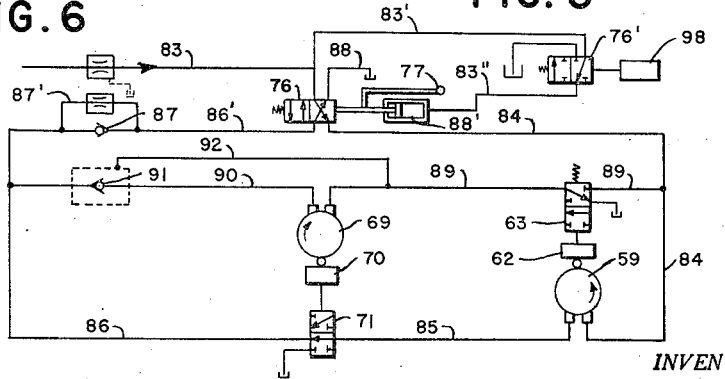
Figure 8:
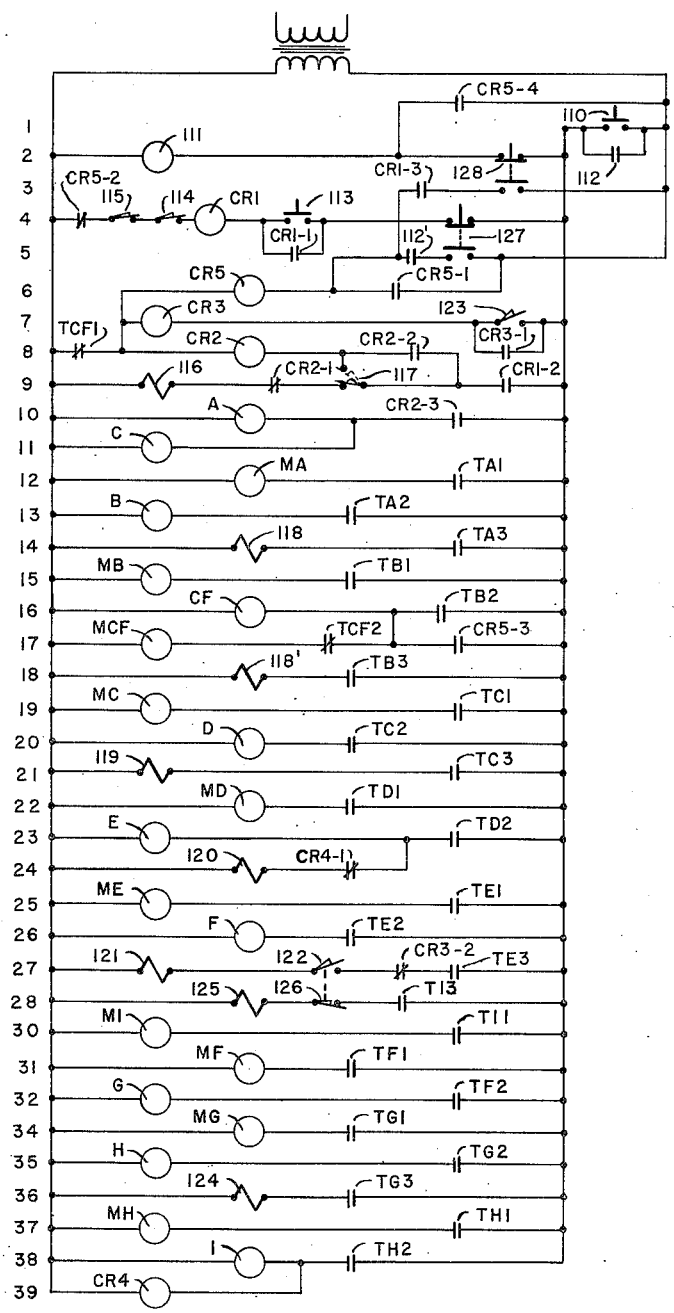

FIG. 7 is a hydraulic circuit diagram for effecting the operation of the unloading mechanism shown in FIG. 4; and FIG. 8 is an electrical diagram of control circuits for effecting the automatic cycle of operations of the separator in accordance with another embodiment of the Referring to the drawings, and particularly FIGS. 1, 2 and 3, the invention is shown as applied to a centrifugal separator including a pedestal base PB that supports a non-rotatable housing H within which a basket B is mounted for rotation on a spindle S. A variable volume delivery pump unit P' is adapted to rotate the basket B through an hydraulic motor unit MB. The material to be centrifuged is adapted to be introduced into the basket B through a coverplate of the housing H, either manually or during an automatic cycle of operations through a feed pipe F. The material being treated within the basket B may be washed at different times during the cycle of operations by the introduction of liquid through a spray device S'.

When the material within the basket B has been centrifuged and washed in the manner intended, it is removed from the basket B by gravitating through the open bottom of the separator. Removal of the solids within the basket B is effected by plow mechanism P, the operation of which is controlled by a controller C mounted on top of the housing H.

Although the operation of the feeding mechanism F, the washing mechanism S', the plow mechanism P and the rotation of the basket B may be manually controlled, the present invention contemplates a mechanism for sequentially operating the aforesaid in accordance with a predetermined cycle of operations. Furthermore, upon the initiation of an automatic cycle of operations, the basket B will be caused to rotate at an unloading speed and the plow mechanism P rendered operative to insure removal of any solids within the basket B prior to the feeding of material thereto. This feature will prevent overloading the absket B in the even the machine had stopped part way through a cycle of operations.

The above described automatic cycling mechanism may include a time-delay coupled with an accelerating means for the basket B so that it will attain the proper loading speed before the introuction of the material to it. The automatic cycle of operations also contemplates the acceleration of the basket B after it has been completely filled with the material to be treated, as well as providing a time interval for the extraction of the liquid from the solids within the basket B prior to the introduction of a washing liquid in the event the solids are desired to be washed. Additionally, the cycle of operations contemplates a predetermined duration of time for the washing while the basket B continues to spin at the high extracting speed.

When the solids within the basket B have been adequately washed, the automatic cycling mechanism may be designed to effect braking of the basket through an hydraulic circuit so as to reduce its speed to the unloading speed, at which time the operation of the plow mechanism P may be initiated to unload the basket B, whereupon the above described cycle may be repeated time after time until the circuit to the automatic cycling mechanism is opened.

In addition to the above automatic cycling or programming arrangement, the present invention contemplates the operation of the plow mechanism P, which operation may be a sub-cycle of operations including movement of the plow into the material caked along the walls of the basket B, thence movement of the plow from the top of the basket B downwardly toward the bottom thereof, the raising of the plow to the top of the basket, and finally movement of the plow away from the sides of the basket toward its center. The previously described subcycle of operations of the plow P is adapted to be effected by the operation of a single manually controlled lever.

Referring to the drawings, and particularly to FIG. 3, the pedestal base PB may include a bedplate 10 of generally triangular construction, at the three apices of which may be located identical pedestals 11 that house chain link assemblies 12 that may support the housing H for limited oscillatable movement.

The housing H may comprise a cylindrical shell 13 to the exterior surface of which brackets 14 may be rigidly secured and extend into the interior of the pedestals 11 to cooperate with chain link assemblies 12 therein. This structure is shown and described in U.S. Patent 2,651,482 to which patent reference is made for specific features not specifically shown or described herein. A concentrically disposed ring 15 may form with a base 16 of the housing H, an annular chamber 17 for collecting liquid that is centrifugally thrown from the interior of the basket B. The circular area defined by the inner periphery of the ring 15 provides what is commonly known in the trade as a bottom discharge through which the solids from the basket B may gravitate. Rib-plates 18 integrally join the ring 15 to a hollow hub portion 19 that rigidly supports a bearing housing 20 for the spindle S.

The spindle S may comprise a vertically disposed shaft 21 mounted within duplex angular contact ball bearings 22 at its lower portion, and a cylindrical roller bearing 23 at its upper portion. The spindle 21 may extend upwardly beyond the cylindrical roller bearing 23 and be provided with a tapered shank portion 24.

The basket B may comprise a perforated cylindrical member 25 for the passage of liquid therethrough. The base of the basket 25 may include a casting 26 having a plurality of radial ribs which provide passages 27 extending therethrough, through which the solids within the basket B may be discharged. An annular coverplate or disc 28 may be provided for the openings 27, but it must be removed prior to the discharge of solids from the interior of the basket B. Casting 26 may also include a shroud housing 29 that is provided with a tapered interior surface 30 adapted to cooperate with the tapered surface 24 of the spindle 21, and a key 31 may be provided between the two, rigidly locking the basket B to the spindle 21. A cover member 32 may be provided for the top of the spindle 21 and it may be rigidly attached to the housing 29. The upper horizontal wall 33 of the basket B may be provided with an enlarged centrally disposed opening 34 for permitting easy access to the interior of the basket B, and for providing clearance for various attachments that are adapted to extend interiorly of the basket B from the top of the housing H. The lower end of the spindle 21 may be provided with a V-groove sheave 35 that is connected through V-belts to a driving V-groove sheave 36 fixed to a shaft 37 of an hydraulic motor 38.

The top of the housing H is closed by a coverplate 39 and it may include a semicircular plate 40 that is hinged to the top of coverplate 39 by hinges 41 and 42. The feed pipe F may extend from the exterior of the coverplate 39 into the space within the basket B through the opening 34 in the top of the basket B in a manner so that as the basket B rotates, interference between it and the feed pipe F will not occur. The feed pipe F may include a directing nozzle 43 that will distribute the slurry or material being fed to the basket B in a uniform manner over the perforated wall 25 of the basket B while the latter is rotated at a predetermined feeding speed. The feed line F may be provided with a solenoid operated valve 44 which may be operated either manually or in accordance with a predetermined cycle of operations, as will be described later. In order to wash the solids from which the liquid has been extracted by centrifugal force, one or more lines 45 may extend from the exterior of the coverplate 39 interiorly of the basket B in somewhat the same manner as the feed pipe F extends thereinto. Each line 45 may include a spray nozzle 46 having jet directing elements 47 arranged to distribute uniformly a spray of liquid onto the entire wall 25 of the basket B thereby to wash completely all solid matter held by centrifugal force in contact with the wall. The exterior portion of each line 45 may also include a solenoid operated valve 48 that may be manually operated or controlled by the cycle of operations to be described later.

The plow mechanism P may comprise a vertically disposed shaft 49 on which is formed a rack 50 (FIG. 4). The lower end of the shaft 49 may be provided with a plow element 51 having a blade portion 52 adapted to be moved into cooperating position with the solids that adhere to the side 25 of the basket B. The shaft 49 extends upwardly through the top coverplate 39 of the housing H, through a housing 53 surrounding the control operating mechanism C and into an auxiliary housing 53' mounted on top of housing 53. The shaft 49 extends through a cylindrical standard 54 that supports thrust bearing 55. Thrust bearing 55 is fixed to standard 54 and is gripped between gear 57 and an inwardly flanged collar 56, which is fastened to the gear 57 in a manner to take thrust in either direction. The spur gear 57 may be splined to the shaft 49 by the spline 58 so that the shaft 49 can oscillate and, at the same time, reciprocate through the gear 57. The spur gear 57 is adapted to mesh with a spur gear 58' fixed to the driven shaft of a single oscillatable vane hydromotor 59 having inlet and outlet ports 60 and 61. The end of the shaft of the motor 59 opposite that to which the gear 58' is fixed may be provided with a rotation control cam 62 that may actuate a four-way hydraulic valve 63 having ports 64 and 65, all for a purpose to be described later.

In order to prevent plow blade 52 from engaging the wall 25 of the rotating basket B, a rotation control stop 66 is fixed to the shaft of the motor 59 adjacent gear 58', and it may cooperate with an abutment 67 on which motor 59 is mounted. The stop 66 is adapted to be adjusted in a manner to permit its cooperation with abutment 67 prior to the blade 52 engaging the wall 25 of the basket B.

Many processes in which the centrifugal separator will be employed may require a seal between the cover 39 and the reciprocable, oscillatable shaft 49 to prevent the escape of noxious fumes from, or the ingress of foreign matter to the interior of the basket B. In order to provide such a seal and still employ the rack 50, the teeth of the latter extend from the upper end of shaft 49 downwardly a distance substantially equal to the interior height of the basket B, and the overall length of the shaft 49 is more than twice the interior height of the basket B.

Referring to FIG. 4, the rack 50 of the shaft 49 is adapted to mesh with a special gear 68 mounted on the out-put shaft of another hydromotor 69 similar to motor 59. This motor may be located in the upper portion of housing 53 so that when the plow 51 is in its lowest position, the bottom tooth of rack 50 is still above the cover 39. Accordingly, a seal can be provided between the cover 39 and the cylindrical portion of shaft 49 extending through the cover 39 into the basket B. When the plow 51 is in its upper position, the portion of the shaft 49 including the rack 50 will extend from the gear 68 to the top of the auxiliary housing 53'.

The end of the shaft of the motors 69 opposite that which supports the special gear 68 is provided with a vertical control cam 70 adapted to actuate a four-way valve 71 having inlet and outlet ports 72 and 73. In order to prevent the motor 69 from lowering the plow 51 into contact with the casting 26 of the basket B, a stop collar 74 is adjustably fixed to the top of the shaft 49. Additionally, in order to prevent the motor 69 from raising the plow 51 into engagement with the top 33 of the basket B, a stop collar 75 is adjustably mounted directly above the plow 51 and is adapted to abut the coverplate 39 before the blade of the plow 51 can contact the upper surface 33 of the basket B.

A four-way valve 76 having an operating handle 77 is provided for manually controlling the cycle of operations required of the plow mechanism P. The four-way hydraulic valve 76 also may be provided with a solenoid and piston control (to be described later) so that the plow mechanism P may be automatically operated within a predetermined cycle of operations of various attachments for the centrifugal separator.

Referring to FIG. 2, the motor pump unit P' may include an electric motor 78 that is coupled to an hydraulic pump 79 of the variable-volume positive displacement type, which may be a commercial item such as the Oilgear "DH" pump unit. The quantity of liquid pumped by the pump 79 may be varied by operation of a hand lever 80 or any other type of control. A closed circuit is established between the pump 79 and the hydraulic motor 38 through the lines 81 and 82. Liquid under pressure, from a low pressure gear pump which may be built into the main pump body and also used for supercharging the main pump, is adapted to be supplied to the vane-type hydromotors 59 and 69 of the plow mechanism P through a line 83.

In order to understand the sub-cycle of operations of the plow mechanism P, reference is made to FIG. 7. With the valve 76 in the condition shown in FIG. 7, i.e., manually or hydraulically moved to its leftwardmost position, the supply line 83 feeds liquid past valve 76 through line 84 to the hydromotor 59, causing it to rotate in a counterclockwise direction. The exhaust from motor 59 passes through a line 85, thence through valve 71 to line 86 bypassing the check valve 87 through needle valve 87', thence through line 86' and the valve 76 to drain 88. This counterclockwise rotation of the hydromotor 59 causes the spur gears 58' and 57 to partially rotate the plow 51 in a manner causing the blade 52 thereof to approach the side wall 25 of the basket B. When the blade 52 is as close to the wall 25 as is safe for the operation being performed, the adjustable stop 66 cooperates with the abutment 67, thereby preventing further movement of the blade 52 of the plow 51 toward the wall 25 of the basket B. Since the hydromotor is of the single vane type, continued flow of liquid to it will maintain the blade 52 in its position close to the wall 25 of the basket B. When the stop 66 cooperates with the abutment 67, the cam 62 attached to the shaft of the motor 59 will have operated the four-way valve 63, causing liquid to also pass from line 84 through line 89, thence through the valve 63 to the hydromotor 69, causing it to rotate in a clockwise direction thereby to effect, through the action of gear 68 and rack 50, the feeding of the plow 51 vertically downwardly to remove the solid matter adhering to the wall 25 of the basket B. At the beginning of clockwise rotation of motor 69, cam 70 moves valve 71 to its lower position permitting the liquid from motor 59 to exhaust through it and blocking line 86 from line 85.

The plow 51 continues its downward movement until the stop collar 74 abuts the spur gear 57. The liquid flowing from the hydromotor 69 passes through a line 90 to a pilot check valve 91. A line 92 permits the liquid under pressure from line 89 to open the pilot check valve 91 and allow motor 69 to exhaust through needle valve 87', line 86' and valve 76 to drain 88. The primary function of the pilot check valve 91 is to prevent oil passing through line 90 from motor 69 from being fed to line 86 and line 86' to tank to maintain the plow 51 in its upper position until it has been partially rotated to its material removing position. If the pilot check valve 91 was not present, there might be a tendency for the plow 51 to begin descending due to its own weight tending to rotate motor 69 in a clockwise direction while it is being rotated into the solids on wall 25 of basket B. This would result in the removal of the caked material in a spiral and prevent complete removal of such material at the upper most edge of basket B.

When the solid material in the basket B has been removed from the wall 25, release of the hand lever 77, which is spring loaded, causes the valve 76 to move to a position where the supply liquid from the line 83 passes into line 86', thence past the check valve 87 and pilot check valve 91 and through line 90 to the vertical hydromotor 69, causing it to rotate in a counterclockwise direction. Exhaust from hydromotor 69 is directed to the valve 63, which is still in a position such that liquid in line 89 will pass through it to line 84, from which latter the exhaust of motor 69 passes through valve 76 to tank. This counterclockwise rotation of the vertical hydromotor 69 causes the plow 51 to be raised vertically upwardly until the lower stop collar 75 engages the under surface of the coverplate 39, thereby limiting the upward movement of the plow 51. At this point, the cam 70 actuates the valve 71 moving it to the position shown in FIG. 7 where liquid within the line 86 flows through the valve 71, thence through line 85 to the hydromotor 59, causing it to rotate in a clockwise direction thereby rotating the plow 51 away from the wall 25 of the basket B and toward the spindle S of the centrifuge. When the plow 51 is in its retracted position near the spindle S, the valve 63 is actuated by cam 62 moving it to the position shown in FIG. 7, where pressure oil from line 86' holds the plow in the top position and away from the basket B. The cycle of unloading the basket B will be repeated when the handle 77 of valve 76 is again operated.

As was previously described, the oil gear motor 38 is supplied from a variable volume delivery pump unit 79. The pump unit 79 may be so arranged to supply three volume deliveries, two of which are adjustable externally, and the other internally. The pump unit 79 may be a commercial item such as the Oilgear type "DX" two-way variable delivery pump. With such an installation, the basket B can be rotated at three different speeds, namely, an unloading speed, a loading speed and an extracting speed. The volume deliveries from the pump 79 which control the unloading and extracting speeds are adjustable externally, while the volume delivery controlling the feeding speed is adjusted internally. The pump unit 79 is initially set so that it will deliver a volume of liquid sufficient to run the basket B at the unloading speed of approximately 50 r.p.m. when the motor 78 is energized.

The various functions of the centrifuge, including the feeding of material to the basket B through the line F, the washing of the material by directing liquid through the nozzles 47, the rotating of the basket B at an extracting speed and at an unloading speed, as well as the cyclic operation of the plow 51 in removing the caked material from the wall 25 of the basket B, may be effected in accordance with a predetermined cycle by employing a combination of timers, each of which can be preset to effect the closing of contacts at predetermined time intervals, and all of which are adapted automatically to be reset when the circuits they control are de-energized, as will be described later. In the following description of the circuit of FIG. 6, the numerals in parentheses will refer to the ordinates of the figure to assist in the location of the various electrical components shown therein.

Figure 6:
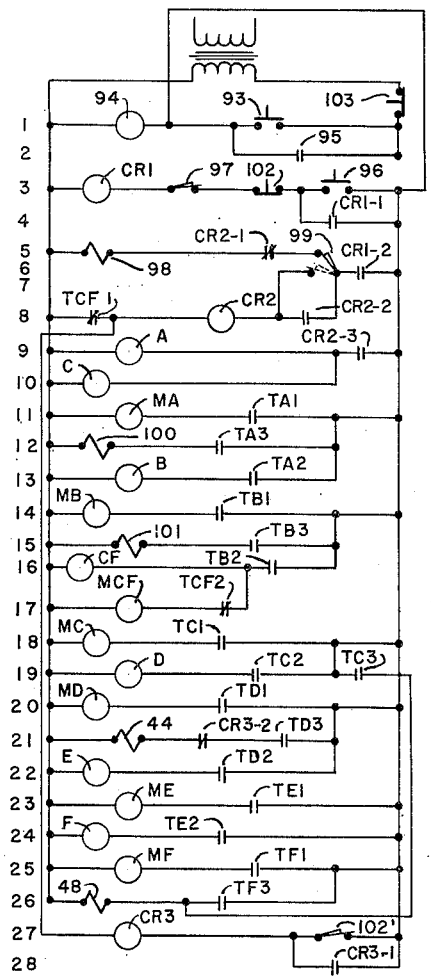
FIG. 6 is an electrical diagram of control circuits for effecting the automatic cycle of operations of the centrifugal separator in accordance with one embodiment of the invention.

Referring to FIG. 6, closing the start push-button switch 93 (1) energizes a relay 94 (1) that controls the motor 78 (FIG. 2). Energization of the relay 94 (1) causes normally open contact 95 (2) to close, thereby holding the relay 94 energized after the start button 93 has been released.

With the motor 78 rotating, the basket B is caused to rotate at an unloading speed of approximately 50 r.p.m. as previously described. Closing the push-button switch 96 (3) energizes the CR1 relay (3) if the limit switch 97 is closed. Limit switch 97 is a safety device for insuring that the coverplate 40 (FIG. 2) is closed. It also serves as a safety device to cause the basket B to brake to the unloading speed in the event the cover 40 is inadvertently opened during a cycle of operations of the machine.

Energization of the relay CR1 (3) causes the closing of normally open CR1-1 contact (4) which serves as a holding contact for maintaining the CR1 relay energized when the push-button switch 96 is released. Energization of CR1 relay (3) also effects the closing of the normally open CR1-2 contact (6), whereupon solenoid means 98 is energized if the limit switch 99 is in its normal position as shown in solid lines in FIG. 6.

Referring to FIG. 7, energization of the solenoid means 98 causes liquid to flow from line 83 through a line 83' to a four-way valve 76', thence through a line 83" to a piston mechanism 88', the rod of which is connected to the hand lever 77 previously described. When the solenoid means 98 actuates the valves 76' and 76, the previously described cycle of operations of the plow 51 occurs. This includes the movement of the plow 51 outwardly from the spindle S of the centrifuge toward the wall 25 of the basket B, thence downwardly along the side of the basket, effecting the discharge of the solids that are adhering to the side wall 25. When the plow 51 reaches the bottom of the basket, the limit switch 99 (5) will be moved to its dotted line position (FIG. 6), thereby de-energizing the solenoid means 98 and effecting the energization of the CR2 relay (8). Energization of the CR2 (8) closes the normally open contacts CR2-2 (8) and CR2-3 (9). De-energization of the solenoid means 98 causes the springs acting on valves 76 and 76' to return them to a position where liquid from line 83' is blocked off from line 83" and liquid from line 83 flows through line 86' instead of line 84. This action causes the plow 51 to be raised, which moves the limit switch 99 to its solid line position; however, the solenoid means 98 is not re-energized because the CR2-1 contact (5) is now held open by the energization of the relay CR2 (8). Closing of the CR2-2 contact (8) holds the CR2 relay energized when the limit switch 99 has moved from its dotted line position to the solid line position.

From the foregoing it is evident that should the centrifugal separator be stopped at any point during its cycle of operations and restarted by reclosing the push-button switches 93 and 96, the plow 51 (FIG. 3) will be caused to move through its cycle of operations to effect unloading of the basket B regardless of whether there is any material within it or not. This will insure that, prior to any feeding of material through the feed pipe F, the basket B will have been emptied.

The automatic cycle of operation which takes place after the above described unloading operation is effected may embody the use of seven timers in the species shown in FIG. 6, which timers may be of the type manufactured commercially by the Eagle Signal Corporation of Moline, Illinois. Throughout the following discussion regarding the species shown in FIG. 6, the seven timers will be identified as A, B, CF, C, D, E, and F. Each of these automatic timers is of the type that embodies solenoid operated clutch mechanism adapted to be energized simultaneously with the energization of synchronous timing motor means. Each timer includes spring resetting mechanism that is adapted to reset its timer upon the de-energization of the solenoid operated clutch means therefor. Each timer is adapted to be preset at any predetermined time value independently of any of the other timers.

The timer A is preset to time the duration of the loading speed of the basket B. The timer B is preset to time the duration of the extracting speed of the basket B. Inasmuch as the timer A cannot be employed to control the feeding of material through the feed pipe F since feeding must be completed when timer A times out, the timer C is employed to control the operation of the timer D, which latter controls the feeding of the material to the basket B. The timer C is in the nature of an interval timer and permits the basket B to accelerate from the unloading speed, at which it is rotating at the beginning of each cycle of operations, to the loading speed, and insures that the basket B is rotating at the loading speed before effecting the energization of the clutch coils of the timer D which, as previously mentioned, controls the feeding of material to the basket B through the feed pipe F. The timer B, for controlling the duration of the extracting speed of the basket B, must obviously encompass the removal of the mother liquor from the material within the basket B, as well as the introduction thereinto of any washing liquid that may be desired during the cycle of operations. Accordingly, an interval timer is required to accomplish this result and for this reason the timer E is preset to time the duration of the extraction of the mother liquor from the solids within the basket B before the introduction of the washing liquid. In order to control the duration of the introduction of the washing liquid into the basket B, a separate timer F is employed. Finally, when the wash has been completed and the timer B has insured the extraction of all the washing liquid, the timer CF is rendered effective to time the duration of the slowing down of the basket B to its unloading speed, after which the cycle can be re-initiated.

From the foregoing it is evident that the combined preset times on the timers A and B must be greater than the combined times on the timers C, D, E and F in order to prevent the deceleration of the basket B to its unloading speed before all of the normal functions of the cycle have been completed.

Referring again to FIG. 6, and resuming the description of the automatic cycle of operations after the unloading cycle of operation of the plow 51, energization of the CR2 relay (8) by plow 51 moving switch 99 (6) to its dotted line position, causes the closing of the CR2–3 contact (9) which energizes simultaneously the clutch coils of the timers A and C (9, 10). Energization of the clutch coil A (9) closes the normally open contact TA1 and TA3 (11, 12). Closing of the TA1 contact (11) energizes the MA motor which times the duration that the machine will operate at the loading speed. Closing the contact TA3 (12) energizes the low speed solenoid valve 100 (12) which operates the control 80 (FIG. 2) of the variable displacement pump 79 to select a volume of oil delivered to the hydraulic motor 38 to cause it to rotate the basket B at the loading speed.

Simultaneously with the energizing of the clutch coil of the timer A, the clutch coil of the timer C (10) is energized. Energization of the clutch coil of the timer C closes the TC1 and TC3 contacts (18, 19). Closing the contact TC1 (18) energizes the timer motor MC (18) which times the interval within which the machine starts to accelerate from its unloading speed to low speed previous to the feeding of material to the basket B. Closing the contact TC3 (19) may be employed to energize solenoid valve 48 (26) which controls the feeding of washing liquid into the basket B through the nozzle 46. This may be desirable during the acceleration of the basket B to its loading speed to wash the heel of cake left in the basket after unloading, or it may not be employed at all, in which case there would be no conductor from the TC3 contact (19) to the line (26).

At the end of the time interval preset on the timer C, it effects the opening of the TC1 and TC3 contacts (18, 19) and the closing of the TC3 contact (19), without, however, effecting the de-energization of the clutch coils of the timer C (10). Closing the TC2 contact (19) effects energization of the clutch coils of the timer D (19) which causes closing of TD1 and TD3 contacts (20, 21). Closing the TD1 contact (20) energizes the synchronous motor MD for the timer D and closing the TD3 contact (21) energizes the feed solenoid 44 (21) which effects the flow of material to be treated through the feed pipe F into the basket B (FIG. 3). While not shown in the drawings, should it be desired, a steam jet may be incorporated within the feed line F, and it may be controlled by a solenoid operated valve that is wired in a parallel circuit with the feed solenoid 44 to facilitate the feeding of material through the line F.

As the timer D times out, it effects the opening of the TD1 and TD3 contacts (20, 21) and the closing of the TD2 contact (22). Opening of the TD3 contact (21) de-energizes the feed solenoid 44 (21) and stops the flow of material through the feed pipe F into the basket B. Closing of the TD2 contact (22) energizes the clutch coil for the timer E (22) which closes the TE1 contact (23). Closing the TE1 contact energizes the synchronous motor ME (23) for the E timer which times the interval during the extraction of the mother liquor from the material in the basket B. A load indicator limit switch may be incorporated in the control circuit to stop the feed to the basket B in the event it becomes full before the timer D times out. Should the basket B become full before timer D times out, a limit switch 102' (27) closes, thereby energizing the CR3 relay (27), consequently closing CR3–1 contact (28) and opening CR3–2 contact (21). Closing CR3–1 contact (28) holds the relay CR3 energized in the event the limit switch 102' makes and brakes. Opening the CR3–2 contact (21) de-energizes the solenoid 44 (21), thereby stopping the feed of material to the basket B through pipe F.

Simultaneously with the timer D (19) timing out, the timer A (9) times out, opening TA1 and TA3 contacts (11, 12) and closing contact TA2 (13). Closing contact TA2 energizes the clutch coil of the timer B (13) which effects the closing of the TB1 and TB3 contacts (14, 15). Closing the TB1 contact (14) energizes the synchronous motor MB (14) for the timer B which times the duration of the rotation of the basket B at its extracting speed. Closing the TB3 contact (15) energizes the solenoid 101 (15) which actuates the control 80 of the pump 79 (FIG. 2) thereby to supply sufficient oil to the motor 38 to effect rotation of the basket B at its extracting speed.

As the timer E times out, the contact TE1 (23) opens and the contact TE2 (24) closes. Closing the TE2 contact energizes the clutch coil of the timer F (24) which thereby effects closing of the contacts TF1 and TF3 (25, 26). Closing of the contact TF1 energizes the motor MF for the timer F which times the length of the washing operation. Closing the contact TF3 (26) energizes the solenoid 48, thereby effecting the feeding of the washing liquid through the nozzle 46 (FIG. 3) into the basket B. As the timer F times out, the contacts TF1 and TF3 (25, 26) are opened. After the washing operation of the machine has been terminated, the basket B will continue to spin at the extracting speed until the timer B (13) times out.

As the timer B (13) times out, contacts TB1 and TB3 (14, 15) open and contact TB2 (16) closes. Opening of the contact TB3 de-energizes the high speed solenoid valve 101 and since contact TA3 (12) has already been opened when the timer A timed out, the low speed solenoid valve 100 is also de-energized. Accordingly, with both the low and high speed solenoid valves 100 and 101 de-energized, the hydraulic pump 79 will deliver sufficient oil to the hydraulic motor 38 to cause it to rotate the basket B at its unloading speed, as previously explained. This action of de-energizing the high speed solenoid 101 with the low speed solenoid 100 being de-energized, provides an automatic braking mechanism within the hydraulic circuit through the action of the control 80 being automatically adjusted to a position where the liquid from the pump 39 will be only sufficient to rotate the hydraulic motor 38 at its low unloading speed of around 50 r.p.m.

Opening the contact TB1 (14) de-energizes the motor MB (14) of the timer B (13). However, the clutch coil of the timer B (13) will still remain energized, as previously explained with respect to the clutch coils for the timer C (10).

Closing of the TB2 switch (16) energizes the clutch coil of the CF timer (16) and also energizes the MCF synchronous motor (17) of the timer CF (16) which latter times the interval before opening the TCF1 and TCF2 contacts (8, 17). When the TCF1 contact (8) opens, it de-energizes the CR3 relay (27) if it is in use as previously explained, which opens the CR3–1 contact (28) and closes the CR3–2 contact (21). When the TCF1 contact opens, the CR2 relay (8) is also de-energized whereupon the CR2–1 contact (5) closes, thereby re-energizing the solenoid valve means 98, thus initiating the cycle of operation of the plow 51 to unload the solid matter within the basket B. De-energizing the CR2 relay (8) also causes the opening of the CR2–3 contact (9), whereupon the clutch coils of the timers A and C become de-energized. This causes the disengagement of the clutches of the timers A and C, and spring means within the timers effects their resetting to their initial condition.

Resetting of the timers A and C causes the opening of the TA2 contact (13) and the TC2 contact (19). Accordingly, the clutch coil of the timers B (13) and D (19) become de-energized, whereupon their clutches become disengaged and spring means within these timers effects their resetting to their initial condition.

As the timer D is reset to its initial condition, it causes the opening of the TD2 contact (22) which de-energizes the clutch coil of the E timer (22), whereupon the clutch of this timer is disengaged and spring means therein effects the setting of the timer E to its initial condition. Resetting of the timer E to its initial condition effects the opening of the TE2 contact (24), whereupon the clutch coil of the F timer is de-energized, causing disengagement of the clutch and spring means therein to reset the F timer to its initial condition. Also, as the B timer (13) is reset to its initial condition, it opens the TB2 contact (16), whereupon the clutch coil of the timer CF (16) is de-energized and its clutch becomes disengaged while spring means therein effects its resetting to its initial condition.

From the foregoing it is evident that all of the seven timers have been reset to their initial conditions so that when the plow 51 reaches its lowest position in unloading the material adhering to the wall of the basket B, it moves switch 99 (6) to its dotted line position, thereby re-energizing CR2 relay (8) which initiates another cycle of operations. The separator will continue to recycle as above described so long as the Stop button 102 (3) is not pressed.

In the event it is desired to stop the operation of the centrifuge at any point during its cycle of operations, it is only necessary that the operator press the push-button switch 102 (3) which will interrupt the flow of current to all relays, timers and solenoids within the circuit. This will cause the stopping of all of the timer motors, the setting of all the timers to their initial condition, and the automatic braking of the machine to approximately 50 r.p.m. The only way to start the cycle again is to begin by closing the switch 96 (3) which will effect the energization of the solenoid means 98, thereby initiating a cycle of operations of the plow 51 to unload the basket B prior to the automatic cycle being recommenced.

After the basket speed has been reduced to approximately 50 r.p.m. by opening the push button switch 102 (3), the complete shutting down of the machine may be effected by opening push button switch 103 (1) thereby interrupting the current to the motor coil 94 (1). Restarting the machine requires closing the push button switch 93 (1) and subsequently closing the push button switch 96 (3).

Figure 5:
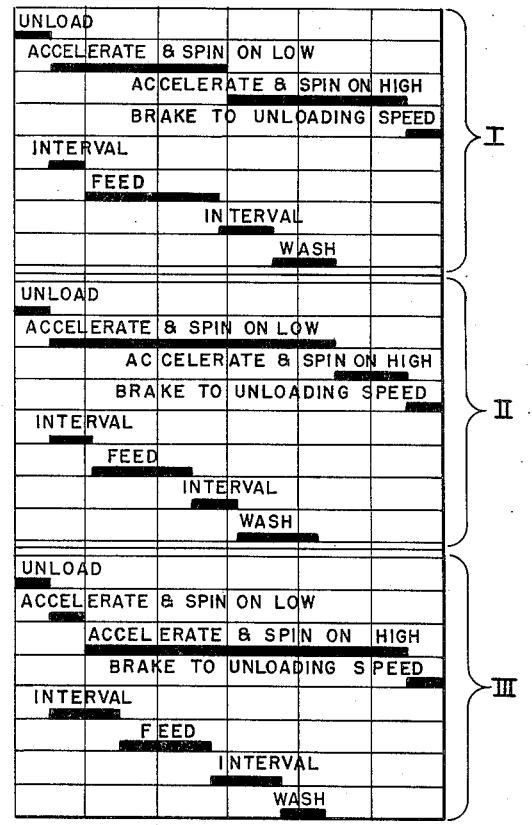
FIG. 5 is a chart showing a typical timing cycle that may be accomplished with one embodiment of the centrifugal separator to which the principles of the invention have been applied.

Referring to FIG. 5, in which three typical timing cycles are shown in chart form, it is evident that a flexible cycle of operations has been devised. For example, in the first typical cycle of FIG. 5, feeding material through the feed pipe F is occasioned during the low speed of the basket B. In this first typical cycle, it is evident that the washing operation occurs during the period of time when the basket B is rotating at its extracting speed.

In the second typical cycle of FIG. 5, the feeding of the material through the feed pipe F takes place during the low speed operation of the basket B, as does the washing operation.

In the third typical cycle of FIG. 5, it is apparent that the feeding of material through the feed line F takes place, as does the washing operation of the material, during the extracting speed of the basket B.

From the foregoing it is evident that a great number of combinations of functions can be automatically effected in the cycle of operations for the centrifugal separator of this invention.

In FIG. 8, an electrical diagram similar to that shown in FIG. 6 is disclosed, but it covers another embodiment of the invention. Closing the Start push button switch 110 (1) energizes a relay 111 (2) that controls the motor 78 (FIG. 2). Energization of the relay 111 causes normally open contacts 112 (2) and 112' (5) to close. Closing contact 112 holds relay 111 energized after the start button 110 has been released; and closing of contact 112' allows relay CR5 (6) to be energized when stop button 127 (4, 5) is pressed.

With the motor 78 rotating, the basket B is caused to rotate at the unloading speed of approximately 50 r.p.m. as previously explained. The machine will run at this speed until the control circuit is energized or the electric motor de-energized. Closing the push button switch 113 (4) energizes the CR1 relay (4) provided the cover limit switch 114 and the unbalance limit switch 115 are closed. The cover limit switch 114 is the same as the cover limit switch 97 (3) of FIG. 6; while the unbalance limit switch is a safety switch so that should an abnormal unbalance in the machine result from a poorly loaded basket, the resultant excessive gyration of the machine will trip this limit switch and the machine will brake to the unloading speed. This switch prevents undue stress, strain and wear on the machine and its foundation.

Energization of the relay CR1 (4) closes the CR1–1, CR1–2 and CR1–3 contacts (5, 9 and 3). Closing CR1–1 contact maintains relay CR1 (4) energized when start button 113 is released. Closing of the CR1–3 contact will be discussed later. Closing the CR1–2 contact (9) energizes the unloader control valve solenoid 116 (9) which causes the plow 51 to move automatically through its cycle of operations as explained previously in connection with FIGS. 6 and 7. When the plow 51 reaches the bottom of its travel, it moves the unloader limit switch 117 (9) to its dotted line position. Actuation of the switch 117 (9) energizes the CR2 relay (8), whereupon contacts CR2–2 and CR2–3 (8, 10) close and contact CR2–1 (9) opens. Closing the CR2–2 contact holds the CR2 relay energized after the switch 117 (9) is moved to its solid line position when the plow 51 starts its upward travel at the completion of the unloading operation. However, when this occurs, the solenoid valve 116 cannot be re-energized since contact CR2–1 has opened as above explained. Of course, the stopping and re-starting of the centrifugal will effect an unloading operation of the basket B in the same way that the circuit of FIG. 6 functions.

The automatic cycle of operations which takes place after the above described unloading operation is effected under the influence of the circuit of FIG. 8, may embody the use of ten timers identified as A, B, CF, C, D, E, F, G, H and I. The timer B may be an Eagle Signal Microflex timer, catalog number HA44A6, with 60-minute range and contact arrangement B212. Timers A, C, D, E, F, G, H and I may be Eagle Signal Microflex timers, catalog number HA43A6, with 20-minute range and contact arrangement B212. Timer CF may be an Eagle Signal Cycl-Flex timer, catalog number HP23A6 with a 5-minute range. The arrangement of the timers is such that A, B and CF form one circuit controlling the speeds of the machine, whereas C, D, E, F, G, H and I form another circuit which controls a first wash, a delay to extract the first wash, feeding of the material to basket B through line F, a delay to effect the extraction of another liquor from the material fed to basket B, a second wash, a delay to effect the extraction of the second wash, and a third wash.

Referring again to FIG. 8, and resuming the description of the automatic cycle of operations after the unloading operation of the plow 51, energization of the CR2 relay (8) by the plow 51 moving switch 117 (9) to its dotted line position, causes closing of the CR2-3 contact (10) which energizes timer A and timer C clutch coils (10, 11). Energization of the timer A clutch coil closes contacts TA1 and TA3 (12, 14). Closing contact TA1 energizes the MA motor which times the duration that the machine will operate at the loading speed. Closing the TA3 contact (14) energizes the low speed solenoid valve 118 (14) which operates the control 80 (FIG. 2) of the variable displacement pump 79 to select a volume of oil delivered to the hydraulic motor 38 to cause it to rotate basket B at the loading speed.

Simultaneously with the energizing of the clutch coil of the timer A, the clutch coil of the timer C (11) is energized, which closes the TC1 and TC3 contacts (19, 21). Closing the contact TC1 (19) energizes the timer motor MC (19) which in the species shown in FIG. 8 times the duration the first wash is fed into the machine. Closing the contact TC3 (21) energizes the first wash control solenoid 119 (21), thus introducing the first wash into the machine through nozzle 46. As timer C times out, contacts TC1 and TC3 open and contact TC2 closes, but the timer clutch coil C (11) remains energized as previously explained in connection with FIG. 6. Opening contact TC1 (19) de-energizes the timer motor MC (19), and opening contact TC3 (21) de-energizes the wash control valve solenoid 119 (21), thus stopping the feeding of the first wash into the basket B.

Closing contact TC2 (20) energizes timer D clutch coil (20) which closes contact TD1 (22). Closing contact TD1 energizes timer motor MD (22) which times the duration for draining the first wash before introducing a slurry feed to the machine. As timer D times out, contact TD1 (22) opens and contact TD2 (23) closes, but the clutch coil remains energized as previously explained. Opening contact TD1 de-energizes the timer motor MD (22). Closing contact TD2 energizes timer E clutch coil (23) and also energizes the filtrate control valve solenoid 120 (24) for a purpose to be described.

Energizing the timer E clutch coil (23) closes contacts TE1 and TE3 (25, 27). Closing contact TE1 energizes timer motor ME (25) which times the duration slurry is fed into the machines. Closing contact TE3 energizes the feed control valve solenoid 121 (27) provided the filtrate valve limit switch 122 (27) is closed. This limit switch closes when the filtrate control valve solenoid 120 (24) is energized and it functions to shift a filtrate valve (not shown) directing the liquid discharge from the machine to a process line with which the separator is employed, instead of directing the filtrate to a sewer line (not shown). Energizing the feed control valve solenoid 121 (27) opens the feed valve and slurry is fed into the basket B through the line F.

A basket load indicator limit switch 123 (7) similar to switch 102' (27, FIG. 6) may be incorporated in the control circuit for stopping the feed to the machine if the basket B becomes full before the timer E times out. Since it is incorporated in the circuit of FIG. 8 in the same manner it is incorporated in the circuit of FIG. 6, no further discussion of it is deemed necessary.

As timer E (23) times out, contacts TE1 and TE3 (25, 27) open and contact TE2 (26) closes, but the timer clutch coil remains energized. Opening contact TE1 de-energizes timer motor ME (25), and opening contact TE3 de-energizes the feed control valve solenoid 121 (27), if the load indicator switch 123 (7) did not de-energize solenoid 121. Accordingly, the feed of slurry to the machine is stopped.

Simultaneously with the timer E (23) timing out, the timer A (10) times out, whereupon contacts TA1 and TA3 (12, 14) open and contact TA2 closes, but the clutch coil remains energized. Opening contact TA1 de-energizes the timer motor MA (12), and opening contact TA3 de-energizes the low speed control valve solenoid 118 (14). Closing contact TA2 (13) energizes timer B clutch coil (13) which closes contacts TB1 and TB3 (15, 18). Closing contact TB1 energizes timer motor MB (15) which times the duration the machine will operate at the extracting speed. Closing contact TB3 energizes the high speed control valve solenoid 118' (18) which selects the volume of oil delivered by the hydraulic pump 79 to the motor 38 that is sufficient to drive the machine at the extracting speed.

Closing contact TE2 (26) energizes timer F clutch coil (26) which closes contact TF1 (31), energizing timer motor MF (31) which times the duration between the termination of feeding slurry to the basket B and the beginning of a second wash—thereby allowing drainage of the mother liquor from the slurry. As timer F times out, contact TF1 (31) opens and contact TF2 (32) closes, but the timer F clutch coil (23) remains energized. Opening of contact TF1 de-energizes the timer motor MF (31). Closing contact TF2 (32) energizes timer G clutch coil (32) which closes contacts TG1 (34) and TG3 (36). Closing contact TG1 energizes timer motor MG (34) which times the duration a second wash is fed into the machine. Closing contact TG3 energizes the second wash control valve solenoid 124 (36) thereby introducing the second wash into the machine through nozzle 46. The various washes referred to in connection with the circuit of FIG. 8 may flow through the line 45 of FIG. 3 and may include parallel arranged wash ducts each having individually operated solenoid control valves so that different washes may be with different liquids as desired.

As timer G (32) times out, contacts TG1 (34) and TG3 (36) open and contact TG2 (35) closes, but the timer G clutch coil (32) remains energized. Opening contact TG1 de-energizes the timer motor MG (34), and opening contact TG3 de-energizes the second wash control valve solenoid 124 (36), thus terminating the second wash. Closing contact TG2 (35) energizes timer H clutch coil (35) which closes contact TH1 (37). Closing contact TH1 energizes timer motor MH (37) which times the duration for draining the second wash before a third wash is introduced into the machine. As timer H times out, contact TH1 (37) opens and contact TH2 closes, but the timer H clutch coil (35) remains energized. Opening contact TH1 de-energizes the timer motor MH (37). Closing contact TH2 energizes timer I clutch coil (38) and also energizes control relay CR4 (39). Energizing control relay CR4 opens contact CR4-1 (24) for a purpose to be described later.

Energizing the timer I clutch coil (38) closes contacts TI1 (30) and TI3 (28). Closing contact TI1 energizes timer motor MI (30) which times the duration the third wash is fed into the machine. Closing contact TI3 energizes the third wash control valve solenoid 125 (28) provided the filtrate valve limit switch 126 (28) is closed. This limit switch closes when the filtrate control valve solenoid 120 (24) is de-energized by the opening of contact CR4-1 (24) as previously explained, which shifts the filtrate valve to a position directing the liquid discharge from the machine to the sewer line instead of to the process line. Energizing the third wash control valve solenoid 125 (28) opens the third wash valve and third wash is fed into the machine through the nozzle 46.

As timer I times out, contacts TI1 and TI3 (30, 28) open. Opening contact TI1 de-energizes the timer motor MI (30), and opening the contact TI3 de-energizes the third wash control valve solenoid 125 (28), thus stopping the feeding of the third wash into the machine. After the third wash operation has been terminated, the basket B will continue to spin at the extracting speed until timer B times out.

As timer B (13) times out, contacts TB1 and TB3 (15, 18) open and contact TB2 (16) closes, but the timer B clutch coil (13) remains energized. Opening the contact TB3 de-energizes the high speed control valve solenoid 118′ (18). Contact TA3 having been opened as timer A timed out, the low speed control valve solenoid 118 (14) is already de-energized. Accordingly, with both high and low speed control valve solenoids de-energized, the hydraulic pump 79 will only supply sufficient oil to the motor 38 to drive the machine at the unloading speed of approximately 50 r.p.m. Therefore, the hydraulic circuit will brake the machine from high to the unloading speed.

Closing contact TB2 (16) energizes timer CF clutch coil (16) and motor MCF (17). The time setting on this timer should be such that the machine has time to hydraulically brake to the unloading speed before it times out. Upon timing out, contacts TCF1 (8) and TCF2 (17) open and will not close until timer CF clutch coil (16) is de-energized. Opening contact TCF2 (17) de-energizes timer motor MCF (17) and opening TCF1 (8) de-energizes control relay CR2 (8) and de-energizes control relays CR3 (7) and CR5 (6) if they were energized at some time in the cycle of operation, as will be explained later. De-energizing control relay CR2 (8) opens its contacts CR2–2 (8) and CR2–3 (10), and closes its contact CR2–1 (9). Closing contact CR2–1 energizes the unloader control valve solenoid 116 (9) which activates the unloader and plows the solids out of the basket. Opening contact CR2–3 (10) de-energizes timer A and C clutch coils (10, 11) allowing these timers to reset. As timer A resets, contact TA2 (13) opens de-energizing timer B clutch coil (13) allowing it to reset. As timer B resets, contact TB2 (16) opens de-energizing timer CF clutch coil (16) allowing it to reset and close contacts TCF1 and TCF2 (8, 17). Timer C (11) resets timer D (20) in the same manner as timer A (10) reset timer B (13) and each timer in sequence is reset in this same manner and as previously explained in connection with FIG. 6. Thus all timers and relays are in their initial condition so that when the unloader plow 51 actuates limit switch 117 (9) upon moving to its upper position, a new cycle is initiated. The machine will continue to recycle in the above described manner as long as the cycle stop button 127 (4) is not pressed.

When the cycle stop button 127 (4) is pressed, the machine is automatically brought to the unloading speed since all timers including timers A and B are reset for a new cycle. Pressing the cycle stop button 127 (4) de-energizes control relay CR1 (4) and energizes control relay CR5 (6). De-energizing control relay CR1 opens its contact CR1–2 (9) which de-energizes control relay CR2 (8) opening its contact CR2–3 (10) de-energizing all microflex timers and subsequent relays. Since, as above explained, timing out of timer B de-energizes the high speed control valve solenoid 118′, the machine brakes hydraulically to the unloading speed of 50 r.p.m. Energizing control relay CR5 (6) closes its contacts CR5–1 (6) maintaining itself and also closes its contact CR5–3 (17) energizing timer CF (16). Timer CF functions the same as before, giving a delay to allow the machine to be brought to the unloading speed from any speed including top speed before opening its contact TCF1 (8). Opening contact TCF1 de-energizes control relay CR5 (6). While control relay CR5 is energized, its contact CR5–2 (4) is open and prevents re-energization of control relay CR1 (4) until the machine is running at the unloading speed. This prevents pressing the cycle start button immediately after pressing the cycle stop button with the consequent effect that the unloader would start plowing while the machine is braking from high speed to the unloading speed. Pressing the cycle stop button 127 (4) de-energizes control relays CR1 (4) and CR2 (8), while pressing the cycle start button 113 (4) energizes only control relay CR1 (4). Control relay CR2 (8) is energized by the unloader limit switch 117 (9) at the end of the unloading operation. In effect, each time the cycle stop button is pressed a period of time equal to the time setting of timer CF (16) must elapse before the control cycle can again be started.

In order to prevent stopping of the hydraulic pump 79 by pressing switch 128 (2), before the machine has been brought to the unloading speed, contact CR5–4 (1) is employed. It closes upon energizing the CR5 relay (6) and remains closed until the CF relay (16) is de-energized as previously explained. Once the machine has been brought to the unloading speed and control relay CR5 (6) is de-energized, the hydraulic drive stop switch 128 (2) can be pressed to stop the hydraulic pump 79.

From the foregoing description regarding FIG. 8, it is evident that the certain interlocking safety features are incorporated in the control circuit, some of which are present in the circuit of FIG. 6 while others are specific to the circuit of FIG. 8.

For example, the control circuits of FIGS. 8 and 6 provide a means to insure that the hydraulic drive motor 78 is operating before the control circuit can be energized. In other words, in FIG. 8 switch 110 (1) must have been closed before the closing of switch 113 (4) will be effective. In FIG. 6, switch 93 (1) must be closed before closing switch 96 (3).

The control circuit in both FIGS. 6 and 8 cannot be energized unless the cover 40 is closed due to the location of the limit switch 97 (3, FIG. 6) and 114 (4, FIG. 8). Should a serious unbalance condition occur during the functioning of the machine operating under the control circuit of FIG. 8, the CR1 relay (4) is de-energized, thereby opening CR1–2 switch (9) and de-energizing CR2 relay (8) which latter sets off the sequence that returns the speed of the machine to the unloading speed.

Since in both species of FIGS. 6 and 8, the recycle of the operations is initiated by plow 51 operating switch 99 (5, FIG. 6) and 117 (9, FIG. 8) to their solid line positions which occurs at the end of the unloading operation, a new cycle cannot be started unless the basket B has been emptied.

In the species of FIG. 8, the presence of the relay CR5 (6) prevents re-energizing the control circuit once it has been de-energized until the machine brakes to the unloading speed. This is due to the CR5–3 contact (17) closing, thereby energizing the timer CF (16) which, as previously explained, sets up the sequence that causes resetting of all timers including A and B which latter when reset de-energize solenoid valves 118 (14) and 118′ (18). For the same reason, the hydraulic drive cannot be stopped by actuating switch 128 (2) until the machine brakes to its unloading speed.

Since the de-energizing of relay CR2 (8, FIG. 6) and (8, FIG. 8) sets off the sequence that returns the speed of the machine to the unloading speed, and the circuits for unloading solenoid valves 98 (5, 7, FIG. 6) and 116 (9, FIG. 8) include normally closed CR2–1 switches, it follows that unloading can only occur after the machine is running at its unloading speed.

Although the various features of the new and improved centrifugal separator and control cycle mechanism therefor have been shown and described in detail to fully disclose two embodiments of the invention, it will be evident that numerous changes may be made in such details, and certain features may be used without others without departing from the principles of the invention.

What is claimed is:

1. In a centrifugal separator having a rotatable basket with a bottom discharge means, a cover for said centrifugal separator; a basket unloading mechanism comprising a vertically reciprocable oscillatable shaft having a spline and rack thereon, and extending from the interior of said basket upwardly beyond the top of said cover; a housing on top of said cover surrounding said shaft; a standard within said housing through which said shaft passes; a spur gear mounted between bearings on said standard and splined to said shaft; first rotatable hydraulic motor means within said housing and geared to said spur gear; separate rotatable hydraulic motor means within said housing and having a gear connected to it and in mesh with the rack on said shaft; means for supplying fluid to both of said hydraulic motor means; and separate cam-operated valve means for each of said hydraulic motors and arranged to effect the operation of said first rotatable hydraulic motor means at the beginning and end of a cycle of operations.

2. In a centrifugal separator having a rotatable basket with a bottom discharge means, a basket unloading mechanism comprising a vertically reciprocable oscillatable shaft; a plow at the lower end of said shaft; a first hydraulic motor means for partially rotating said shaft; a second hydraulic motor means for reciprocating said shaft between two limiting positions; an hydraulic circuit for said motors including manually operable means for supplying liquid to said first motor; means responsive to the operation of said first motor for causing said liquid to be supplied to said second motor when said first motor has performed a predetermined function; means responsive to the operation of said second motor for insuring the continued activity of said first motor in its initial direction after release of said manually operable means; means responsive to the release of said manually operable means for causing reversing of the activity of said second mentioned motor while said first motor continues to be active in its initial direction; and means responsive to the reverse activity of said second motor for causing the reverse activity of said first motor after said second motor has performed a predetermined function.

3. In a centrifugal separator having a rotatable basket with a bottom discharge means, a basket unloading mechanism comprising a vertically reciprocable oscillatable shaft; a plow at the lower end of said shaft; a first hydraulic motor means for partially rotating said shaft; a second hydraulic motor means for reciprocating said shaft between two limiting positions; an hydraulic circuit for said motors; a four-way valve resiliently urged to a position where fluid is supplied to said motors to cause them to become active in a direction to raise said plow to its upper position and to rotate it away from the wall of said basket; manually operable means for moving said four-way valve to a position where said first motor is activated in a manner to move said plow toward the wall of said basket; means responsive to the completion of the function of the first motor for causing the activation of said second motor in the direction to lower said plow; and means responsive to the release of said four-way valve for activating said second hydraulic motor means reversely prior to activating said first hydraulic motor means reversely.

4. In a centrifugal separator having a rotatable basket with a bottom discharge means, a basket unloading mechanism comprising a vertically reciprocable oscillatable shaft; a plow at the lower end of said shaft; a first hydraulic motor means for partially rotating said shaft; a second hydraulic motor means for reciprocating said shaft between two limiting positions; an hydraulic circuit for said motors; means within said circuit for causing a cycle of operations to be performed including partial rotation of said plow from a point away from the wall of said basket to a point in close proximity to said wall, lowering said plow from an upper position to a lower position, raising said plow to its upper position and rotating said plow away from the wall of said basket; and single lever means for controlling said cycle of operations.

5. In a centrifugal separator having a rotatable basket with a bottom discharge means, a basket unloading mechanism comprising a vertically reciprocable oscillatable shaft; a plow at the lower end of said shaft; a first hydraulic motor means for partially rotating said shaft; a second hydraulic motor means for reciprocating said shaft between two limiting positions; an hydraulic circuit for said motor; a four-way valve resiliently urged to a position where fluid is supplied to said motors to cause them to be active in a direction to raise said plow to its upper position and to rotate it away from the wall of said basket; manually operable means for moving said four-way valve to a position where said first motor is activated in a manner to move said plow toward the wall of said basket; means for maintaining said plow in its upper position while said plow is rotated toward the wall of said basket; means responsive to the completion of the function of the first motor for causing the activation of said second motor in a direction to lower said plow; means for maintaining said plow in close proximity to the wall of said basket while said plow is moved from its upper to its lower position; and means responsive to the release of said four-way valve for activating said second hydraulic motor means reversely prior to activating said first hydraulic motor means reversely.

6. In a centrifugal separator having a rotatable basket with a bottom discharge means, a variable speed transmission for rotating said basket at a plurality of separate speeds, said variable speed transmission including an hydraulic constant displacement motor drivingly connected to said basket; variable displacement pump means having an automatically adjustable displacement varying means; a closed circuit between said variable displacement pump and said constant displacement motor; means for rotating said pump; and time-operated control means for varying the displacement of said variable displacement pump within a cycle of operations.

7. In a centrifugal separator having a basket; means for rotating said basket at a relatively slow unloading speed; means for feeding material to said basket; sub-cycle control means for unloading said basket; an automatic cycle control for said separator including timing means adapted to effect a speed change of said basket to a loading speed and for timing the duration of said loading speed; separate timing means adapted to effect a speed change of said basket to and during an extracting speed; additional timing means adaped to initiate such sub-cycle control means, said last mentioned timing means being responsive to the operation of the extracting speed timing means; and means responsive to the interruption and re-starting of said automatic cycle control for initiating the activity of said sub-cycle control means.

8. In a centrifugal separator having a basket; means for rotating said basket at a relatively slow unloading speed; means for feeding material to said basket; sub-cycle control means for unloading said basket; an automatic cycle control for said separator including timing means adapted to effect a speed change of said basket to a loading speed, and for timing the duration of said loading speed; separate timing means adapted to effect a speed change of said basket to and during an extracting speed after said first mentioned timing means times out; additional timing means adapted to initiate said sub-cycle control means, said last mentioned timing means being responsive to the timing out of the extracting speed timing means, at which time said basket speed returns to its relatively slow unloading speed; and means responsive to the interruption and re-starting of said automatic cycle control for initiating the activity of said sub-cycle control means.

9. In a centrifugal separator having a basket; means for rotating said basket at a relatively slow unloading speed; means for feeding material to said basket; means for introducing a washing liquid to said basket; sub-cycle control means for unloading said basket; an automatic cycle control for said separator including timing means adapted to effect a speed change of said basket to a loading speed and for timing the duration of said loading speed; separate timing means adapted to be energized simultaneously with the energizing of said first mentioned timing means for insuring the increase in speed of said basket from said relatively slow unloading speed to said loading speed; additional timing means adapted to be energized upon the timing out of said second mentioned timing means for timing the feeding of material to said basket; additional timing means adapted to effect a speed change of said basket to and during an extracting speed after said first mentioned timing means times out; additional timing means adapted to initiate said sub-cycle control means, said last mentioned timing means being responsive to the timing out of the extracting speed timing means, at which time said basket speed returns to its relatively slow unloading speed; and means responsive to the interruption and re-starting of said automatic cycle control for initiating the activity of said sub-cycle control means.

10. In a centrifugal separator having a basket, means for rotating said basket at a relatively slow unloading speed; means for feeding material to said basket; a basket unloading mechanism comprising a vertically reciprocable oscillatable shaft; a plow at the lower end of said shaft; hydraulic motor means for rotating and reciprocating said shaft; an hydraulic circuit for said hydraulic motors including means for causing said motors to actuate said plow to perform a sub-cycle of operations including movement of said plow from a point away from the wall of said basket to a point in close proximity thereto, lowering said plow from an upper position to a lower position, raising said plow to its upper position and rotating said plow away from the wall of said basket; an automatic cycle control for said separator including timing means adapted to effect a speed change of said basket to a loading speed and for timing the duration of said loading speed; separate timing means adapted to effect a speed change of said basket to and during an extracting speed; additional timing means adapted to initiate said sub-cycle control means, said last mentioned timing means being responsive to operation of the extracting speed timing means; and means responsive to the interruption and re-starting of said automatic cycle control for initiating the activity of said sub-cycle control means.

11. In a centrifugal separator having a rotatable basket with a bottom discharge means, a basket unloading mechanism comprising a vertically reciprocable oscillatable shaft; a plow at the lower end of said shaft; a first oppositely rotatable hydraulic motor means for partially rotating said shaft; a second oppositely rotatable hydraulic motor means for reciprocating said shaft between two limiting positions; an hydraulic circuit for said motors; a four-way valve resiliently urged to a position where fluid is supplied to said motors to cause them to rotate in a direction to raise said plow to its upper position and to rotate it away from the wall of said basket; solenoid operated valve means for moving said four-way valve to a position where said first motor is rotated in a manner to move said plow toward the wall of said basket; means responsive to the completion of the function of the first motor for causing the rotation of said second motor in a direction to lower said plow, while still maintaining the rotation of said first motor; means responsive to the de-energizing of said solenoid-operated valve means for activating said second hydraulic motor means reversely prior to activating said first hydraulic motor means reversely; and means responsive to the completion of a cycle of operations of said centrifugal separator for energizing said four-way solenoid valve means.

12. A control for a centrifugal separator having a rotatable basket and an hydraulic drive for normally rotating the basket at a relatively slow unloading speed, and at different other relatively rapid speeds during a cycle of operations, comprising sub-cycle control means for unloading said basket; an adjustable timing means adapted to be preset for timing the duration of rotation of said basket at a loading speed that is substantially greater than said normal unloading speed; another adjustable timing means adapted to be preset for timing the duration of rotation of said basket at an extracting speed that is substantially greater than said loading speed; a plurality of other adjustable timing means for controlling other functions of the separator, the sum of the preset times on said loading and extracting timing means being greater than the sum of the preset times on said other timing means; and means responsive to the interruption and re-starting of said control for initiating the activity of said sub-cycle control means.

13. A control for a centrifugal separator having a rotatable basket and an hydraulic drive adapted normally to rotate said basket at a relatively slow unloading speed, and at differernt other relatively rapid speeds during a cycle of operations, comprising sub-cycle control means for unloading said basket; an adjustable timing means adapted upon becoming effective to energize a solenoid valve for causing the hydraulic drive for said basket to rotate the basket at a loading speed greater than the unloading speed, and upon timing out to de-energize said solenoid valve and render effective another timing device; means responsive to the rendering effective of said other timing device for energizing a solenoid valve for causing the hydraulic drive for said basket to rotate the basket at an extracting speed greater than said loading speed; means responsive to the timing out of said other timing device for de-energizing both said timing devices after a predetermined time interval; and means responsive to the interruption and re-starting of said control for initiating the activity of said sub-cycle control means.

14. In a centrifugal separator, a rotatable basket; a plow mechanism for removing material from the inner periphery of said basket; an hydraulic drive for rotating said basket at a normal relatively slow unloading speed; sub-cycle control means for operating said plow mechanism; a control including a first solenoid valve for adjusting said hydraulic drive for causing it to rotate said basket at a loading speed that is greater than said unloading speed; another solenoid valve for adjusting said hydraulic drive for causing it to rotate said basket at an extracting speed that is greater than said loading speed; first timing means adapted upon becoming effective to energize said first solenoid valve means; means responsive to the timing out of said first timing means for de-energizing said first solenoid valve means and for rendering effective another timing means which upon becoming effective energizes said other solenoid valve means; means responsive to the timing out of said other timing means for de-energizing said other solenoid valve means to thereby slow the rotatable basket to the normal unloading speed; means also responsive to the timing out of said other timing means for rendering effective said plow mechanism; and means responsive to the interruption and re-starting of said control for initiating the activity of said sub-cycle control means.

15. In a centrifugal separator, a rotatable basket; a plow mechanism for removing material from the inner periphery of said basket; an hydraulic drive for rotating said basket at a normal relatively slow unloading speed; sub-cycle control means for operating said flow mechanism; a control including a first solenoid valve for adjusting said hydraulic drive for causing it to rotate said basket at a loading speed that is greater than said unloading speed; another solenoid valve for adjusting said hydraulic drive for causing it to rotate said basket at an extracting speed that is greater than said loading speed; first timing means adapted upon becoming effective to energize said first solenoid valve means; means responsive to the timing out of said first timing means for de-energizing said first solenoid valve means and for rendering effective another timing means which upon becoming effective energizes said other solenoid valve means; means responsive to the timing out of said other timing means for de-energizing said other solenoid valve means to thereby slow the rotatable basket to the normal unloading speed; means also responsive to the timing out of said other timing means for rendering effective said plow mechanism; means for delaying the rendering effective of said plow means until said basket has decreased in speed to its normal unloading speed; and means responsive to the interruption and re-starting of said control for initiating the activity of said sub-cycle control means.

16. In a centrifugal separator, a rotatable basket; an hydraulic drive for rotating said basket at a normal relatively slow unloading speed; means including a first solenoid valve for adjusting said hydraulic drive to cause it to rotate said basket at a loading speed that is greater than said unloading speed; another solenoid valve for adjusting said hydraulic drive for causing it to rotate said basket at an extracting speed that is greater than said loading speed; first timing means adapted upon becoming effective to energize said first solenoid valve means; a first wash control solenoid valve within a line leading to said basket; a second timing means rendered effective simultaneously with said first timing means for actuating and timing the duration of activity of said first wash control valve; a feed control solenoid valve within a line leading to said basket; a first interval timer responsive to the timing out of said second timing means for rendering effective a feeding timing device and said feed control solenoid valve after sufficient time has elapsed to permit draining of said first wash; means responsive to timing out of said first interval timer for directing the discharge from said basket to a process line and for setting up a circuit for said feed control valve solenoid; a second interval timer responsive to the timing out of said feeding timing device for rendering effective a second wash timing means for operating a second wash control valve and for timing the duration of its activity; a third interval timer responsive to the timing out of said second wash timer for timing the draining of said second wash and for energizing a third wash control timer as well as effecting the directing of the discharge from said basket to a sewer line; means responsive to the timing out of said first timing means for de-energizing said first solenoid valve means and for rendering effective a third timing means which upon becoming effective energizes said other hydraulic drive solenoid valve means; and means responsive to the timing out of said third timing means for de-energizing said other hydraulic drive solenoid valve means to thereby slow the rotatable basket to the normal unloading speed.

17. In a centrifugal separator, a rotatable basket; an hydraulic drive for rotating said basket at a normal relatively slow unloading speed; means including a first solenoid valve for adjusting said hydraulic drive to cause it to rotate said basket at a loading speed that is greater than said unloading speed; another solenoid valve for adjusting said hydraulic drive for causing it to rotate said basket at an extracting speed that is greater than said loading speed; first timing means adapted upon becoming effective to energize said first solenoid valve means; a first wash control solenoid valve within a line leading to said basket; a second timing means rendered effective simultaneously with said first timing means for actuating and timing the duration of activity of said first wash control valve; a feed control solenoid valve within a line leading to said basket; a first interval timer responsive to the timing out of said second timing means for rendering effective a feeding timing device and said feed control solenoid valve after sufficient time has elapsed to permit draining of said first wash; means responsive to timing out of said first interval timer for directing the discharge from said basket to a process line and for setting up a circuit for said feed control valve solenoid; a second interval timer responsive to the timing out of said feeding timing device for rendering effective a second wash timing means for operating a second wash control valve and for timing the duration of its activity; a third interval timer responsive to the timing out of said second wash timer for timing the draining of said second wash and for energizing a third wash control timer as well as effecting the directing of the discharge from said basket to a sewer line; means responsive to the timing out of said first timing means for de-energizing said first solenoid valve means and for rendering effective a third timing means which upon becoming effective energizes said other hydraulic drive solenoid valve means; and means responsive to the timing out of said third timing means for de-energizing said other hydraulic drive solenoid valve means to thereby slow the rotatable basket to the normal unloading speed, and to effect the re-setting of all timers to their initial condition.

References Cited in the file of this patent

UNITED STATES PATENTS

| | | |
|---|---|---|
| 1,418,616 | Boisset | June 6, 1922 |
| 1,947,679 | Steps | Feb. 20, 1934 |
| 1,965,840 | Jones | July 10, 1934 |
| 2,080,874 | Pecker | May 18, 1937 |
| 2,119,644 | Miller | June 7, 1938 |
| 2,170,786 | McElroy et al. | Aug. 22, 1939 |
| 2,234,332 | Brewer | Mar. 11, 1941 |
| 2,485,465 | Tholl | Oct. 18, 1949 |
| 2,517,452 | Stindt | Aug. 1, 1950 |
| 2,642,997 | Tompkin | June 23, 1953 |
| 2,667,974 | Hertrich | Feb. 2, 1954 |
| 2,790,553 | Bange | Apr. 30, 1957 |